United States Patent [19]

Erickson

[11] Patent Number: 4,803,958
[45] Date of Patent: Feb. 14, 1989

[54] ABSORPTION HEAT PUMPED COGENERATION ENGINE

[76] Inventor: Donald C. Erickson, 1704 S. Harbor La., Annapolis, Md. 21401

[21] Appl. No.: 94,391

[22] Filed: Sep. 8, 1987

[51] Int. Cl.$^4$ .............................................. F22B 1/00
[52] U.S. Cl. ..................................... 122/21; 237/12.1
[58] Field of Search ...................... 62/480, 238.3, 476, 62/141, 269; 122/21; 237/12.1, 1 R

[56] References Cited

PUBLICATIONS

L. S. Marks, "A Steam-Pressure Transformer", Mechanical Engineering, Jun. 1927, vol. 49, p. 600.
Sellew, "Solution Cycles", Transactions of the American Institute of Chemical Engineering, 1933–1934, p. 562.

Primary Examiner—Henry A. Bennet

[57] ABSTRACT

An open-cycle absorption apparatus for compressing steam from a low pressure to a higher useful pressure is disclosed. The apparatus is particularly useful for upgrading low-temperature jacket-cooling heat from an internal combustion engine to useful pressure steam, e.g., at 5 ATA (500 kPa) or higher. Simple heat-exchange apparatus is involved, using the extra temperature availability of the hot exhaust gas as the driving medium. In FIG. 1, hot exhaust gas heats absorbent solution in desorber 7, and then the absorbent solution absorbs low pressure steam from the jacket cooling circuit of engine 1 in absorber 14. Useful pressure steam is withdrawn from desorber 7 and from steam generation coil 16 in absorber 14.

18 Claims, 3 Drawing Sheets

ABSORPTION HEAT PUMPED COGENERATION ENGINE

TECHNICAL FIELD

This invention relates to apparatus for increasing the utility and utilization of waste heat streams effluent from an internal combustion engine—the hot exhaust gas and the engine cooling system heat. Both heat sources are combined so as to yield steam at a useful pressure higher than the saturation pressure corresponding to the cooling circuit temperature. The apparatus enabling this result is an open cycle thermally actuated solution compressor ("solution thermo compressor") which relies importantly on a particular aqueous absorbent solution.

BACKGROUND ART

It has long been known to utilize hot exhaust from internal combustion engines as the power supply to absorption refrigeration units or to absorption air conditioning units, i.e., closed $NH_3$—$H_2O$ absorption cycles or closed $H_2O$-LiBr absorption cycles. More recently, with increased emphasis on energy conservation, it has additionally been disclosed to apply engine cooling circuit heat to the same purpose.

Sung (U.S. Pat. No. 4,380,909) applies both exhaust gas heat and cooling circuit heat to a single desorber. This has the disadvantage that the desorber must operate at a temperature lower than the temperature of the cooling circuit heat. Since the exhaust gas is at a much higher initial temperature, its extra availability is wasted thereby.

Mori, et al., (U.S. Pat. No. 4,439,999) avoid that limitation by applying the exhaust gas heat to a high temperature desorber, and the cooling circuit heat to a different lower temperature desorber. However, the Mori, et al., disclosure shares the disadvantage of Sung that the cooling circuit heat is normally approximately 110° C. or lower, and that a desorber heated by heat at that temperature is of limited usefulness.

It is also known in the prior art to raise the pressure of exhaust low pressure steam to a higher useful pressure by means of a steam-powered open cycle solution thermocompressor, which uses an aqueous solution of either KOH or NaOH as the absorption medium. Low pressure steam is absorbed into KOH, releasing heat to boil part of the useful steam. High pressure steam is then used to heat and reconcentrate the KOH, boiling the remaining fraction of the useful steam out of the KOH. A pump circulates the KOH solution between the absorption and desorption steps. L. S. Marks describes the basic system in "A Steam-Pressure Transformer", *Mechanical Engineering*, June 1927, Vol. 49 No. 6, p. 600. A variation which incorporates two desorbers with only the higher temperature one being heated by the high pressure steam is reported by W. H. Sellew in "Solution Cycles", *Transactions of the American Institute of Chemical Engineering*, Volume XXX, 1933-34, p. 562.

The above-disclosed solution compressors are limited in effectiveness due to the high temperature corrosion limitations of the disclosed absorbent media; the susceptibility to chemical reaction with trace impurities (e.g., $CO_2$) of the disclosed absorbent media; and the need for high pressure steam to power the solution compressors.

It is known to use an aqueous mixture of alkali metal nitrates in an absorption cycle apparatus for reversibly absorbing and desorbing water vapor: U.S. Pat. Nos. 4,454,724, 4,563,295, and 4,652,270, all assigned to D. C. Erickson.

Most internal combustion engines incorporate an engine cooling circuit. Particularly for reciprocating engines, the heat rejected to the engine cooling system (jacket or cylinder cooling) can approach or exceed the usable content of the engine exhaust gas. Whereas exhaust gas temperature may approach 600° C., cooling circuit temperature is closer to 100° C.

Reciprocating engines are desirable in cogeneration applications due to their high electrical efficiency. However the very low temperature of almost half of their exhaust heat is a severe offsetting disadvantage. In many applications the cooling circuit heat is simply too cold to be useful, and hence a heat rejection system such as a cooling tower or radiator must dissipate it. In other applications, e.g., a hospital, the heat is useful for space or hot water heating, but requires an expensive hydronic or low pressure steam system to distribute it where needed.

What is needed, and one object of this invention, is a means for upgrading the heat from an internal combustion engine cooling circuit into useful pressure steam, e.g., at a pressure of 300 kPa or higher, using only the excess temperature availability in the exhaust gas as the driving force for that upgrading. In other words, it is desired to combine both the low temperature engine cooling heat and the high temperature exhaust gas heat into useful medium temperature heat, in the form of steam, without requiring any mechanical vapor compression apparatus or any significant quantity of mechanical or electrical power input. It is further desired to exhibit a low corrosion rate using low cost materials of construction, and to avoid contamination by trace impurities.

DISCLOSURE OF INVENTION

The above and other useful objects are attained by an apparatus for producing steam at a useful pressure above about 300 kPa absolute from both the combustion exhaust gas heat and the cooling system heat of an internal combustion engine, comprised of:
a. a means for producing at least one supply of low pressure steam at a pressure below about 200 kPa from the said cooling system heat; and
b. an absorption apparatus which is designed, dimensioned, and adapted for containing and circulating a liquid absorbent solution capable of reversibly absorbing and desorbing water vapor, said absorption apparatus comprised of:
  (i) an absorption heat exchanger wherein said low pressure steam is contacted by and absorbed into said absorbent solution, and wherein the heat released thereby is indirectly transferred via said absorption heat exchanger to boiling feedwater, whereby part of said useful pressure steam is produced;
  (ii) a solution pump for increasing the pressure of the absorbent solution from the absorption heat exchanger to at least approximately said useful pressure;
  (iii) a desorption heat exchanger wherein said absorbent solution from said solution pump undergoes indirect heat exchange with said combustion exhaust gas, whereby a second part of said steam at useful pressure is desorbed from said absorbent solution; and (iv) a means for reducing the pressure of said absorbent solution from said desorption heat exchanger and recycling said solution to said absorption heat exchanger.

Although conceptually the hot combustion exhaust could be used to raise high temperature steam, and then that steam used to power the solution thermocompressor desorber as in the prior art, that introduces severe disadvantages which strongly offset the advantages of the disclosed invention.

The open-cycle combustion-gas-heated steam solution compressor is especially advantageous in combination with a reciprocating engine as described. However, it will be recognized that the particular novelties and construction of the open-cycle solution steam compressor described will have application in other environments.

Figure 2:
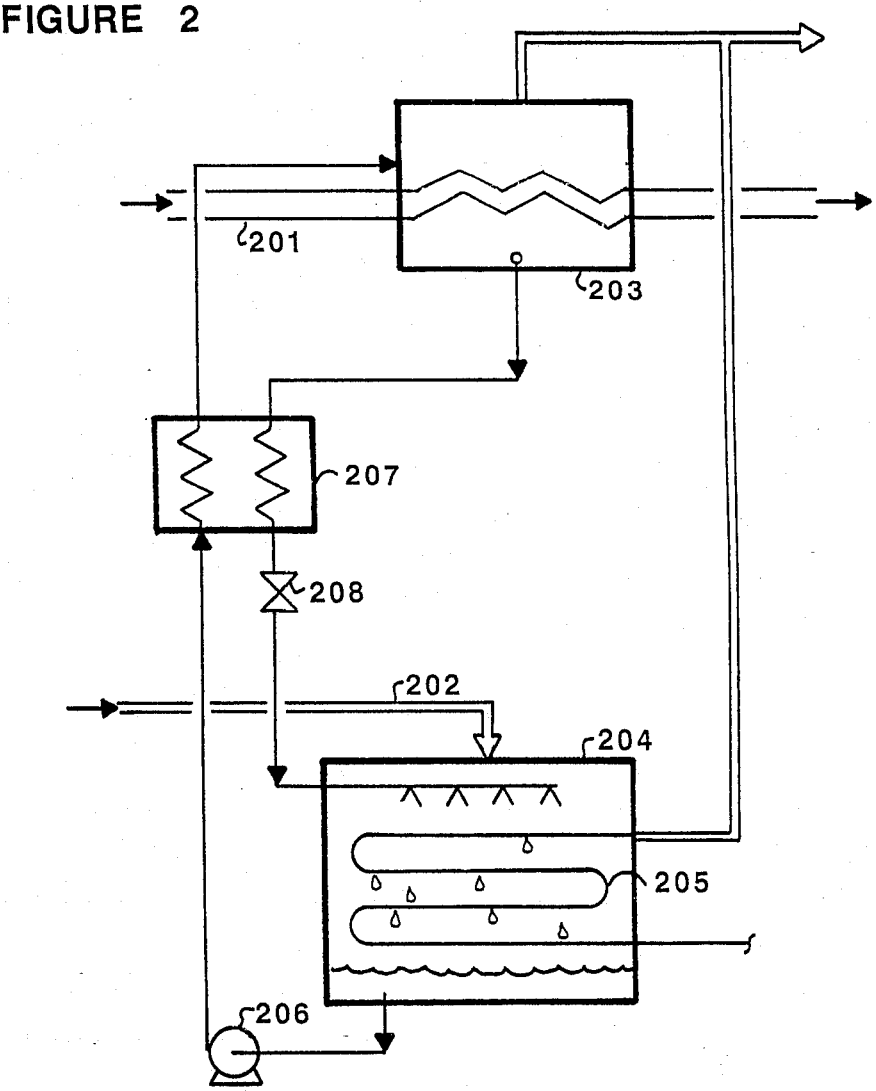

The FIG. 2 flowsheet illustrates the solution compressor alone in its simplest embodiment.

Figure 3:
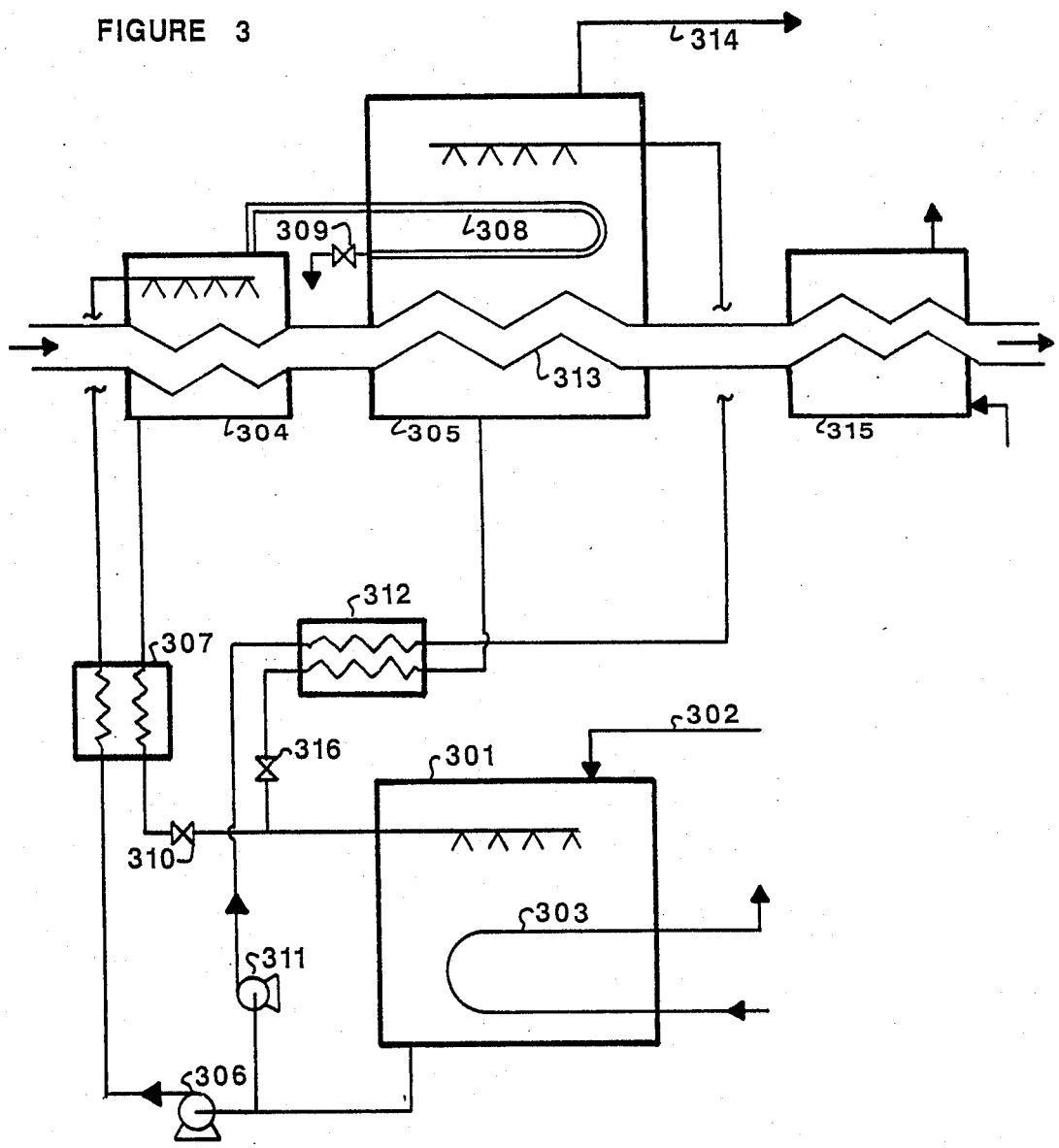

The FIG. 3 flowsheet illustrates a two-stage desorber embodiment of the combustion-gas-fired solution compressor.

BEST MODE FOR CARRYING OUT THE INVENTION

Figure 1:
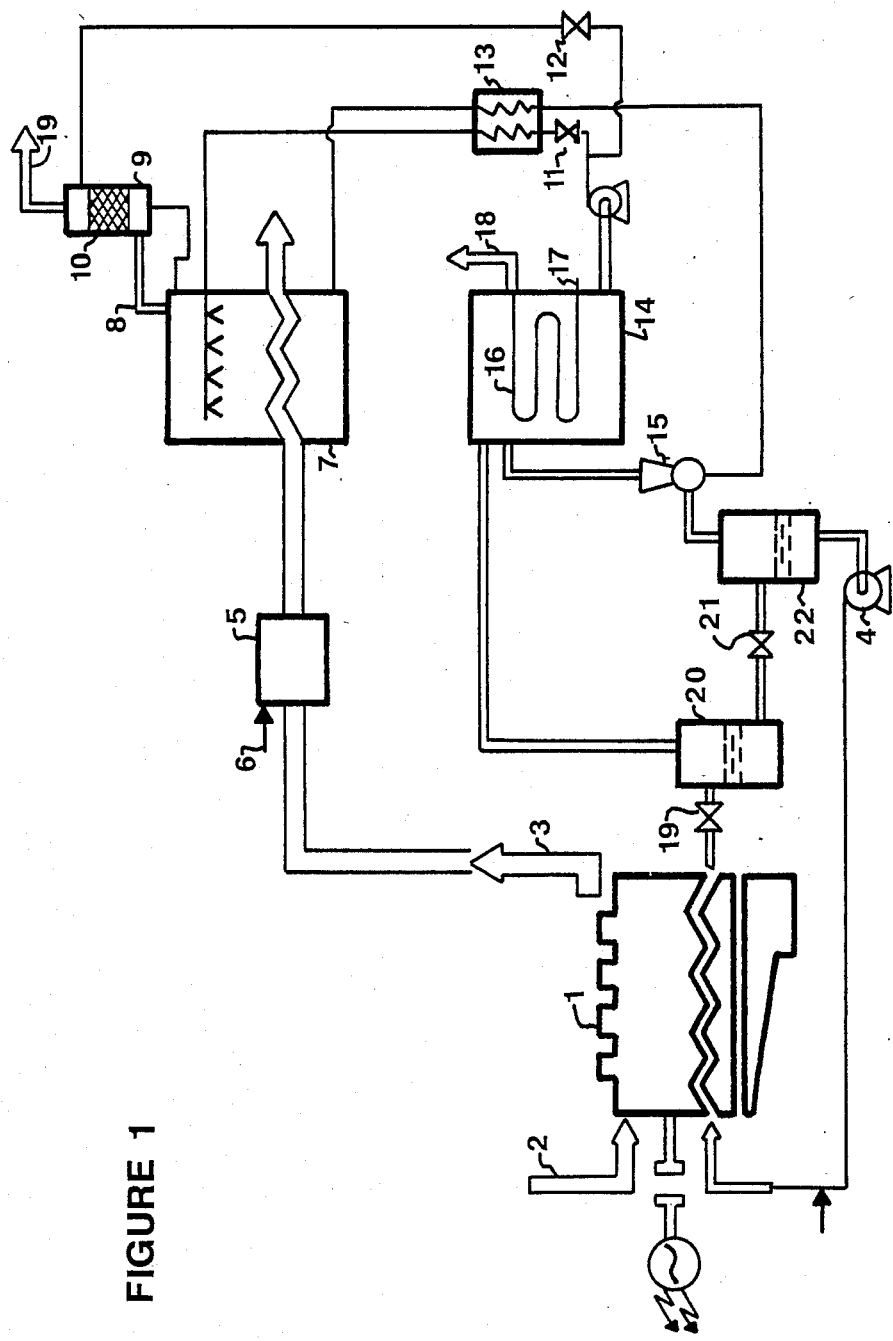
FIG. 1 illustrates the preferred embodiment of the combination of an open-cycle solution compressor and a reciprocating engine, adapted to produce useful pressure steam.

Referring to FIG. 1, internal combustion engine 1 is supplied fuel such as natural gas or petroleum-derived liquid via supply line 2. Hot combustion exhaust exits the engine via exhaust pipe 3, and cooling circuit liquid is circulated via pump 4 through the engine to provide jacket cooling of the combustion cylinders and/or other similar cooling duties. The hot exhaust gas can optionally be further heated in supplementary burner 5 which is supplied fuel via line 6. Then the hot exhaust gas is directed into desorption heat exchanger 7 for indirectly transferring heat to an aqueous absorbent solution at a pressure above about 300 kPa, and more typically above 500 kPa. As a result, steam is desorbed from the aqueous solution and is withdrawn via steam line 8. Preferably the steam is then desuperheated and liquid-scrubbed in component 9, which includes a zone of counter-current vapor-liquid contact material such as random or structured packing. A minor stream of the aqueous solution en route to desorber 7 is used as the scrubbing and desuperheating liquid, on the order of 4% The amount may be controlled by coordinated action of valves 11 and 12, with the remaining major stream being routed through solution heat exchanger 13. Alternatively the feedwater en route to boiler 16 could be used as the liquid scrub medium in component 9.

The aqueous solution is withdrawn from desorber 7 after part of the water is desorbed from it, routed countercurrently back through heat exchanger 13, and reduced in pressure below 200 kPa for feeding to absorption heat exchanger 14. Any means of pressure reduction is possible, such as a throttling valve or a liquid turbine. One preferred method is to depressurize the solution through a jet ejector 15, whereby the momentum developed therein can be used to entrain and subsequently boost the pressure of at least part of the low pressure steam to be supplied to absorber 14. In absorber 14 low pressure steam derived from the engine cooling circuit heat is absorbed into the aqueous solution, and the heat released thereby is indirectly transferred to boiling feedwater, which is supplied to boiling section 16 of absorber 14 by feedwater line 17. The boiler is also at a pressure above about 300 kPa, i.e., at a higher pressure than the low pressure steam being absorbed, due to boiling point elevation. For example, the steam pressure may be increased by a factor of 4 or more. The steam is withdrawn via steam line 18, and preferably combined with steam withdrawn from desuperheater 9 via steam line 19.

Any known means of deriving low pressure steam from the engine cooling circuit heat is permissible. For example, ebullient cooling of the engine may be used, in which steam issues directly from the engine cooling jacket, and pump 4 is only required to supply makeup water. Another example is be to circulate engine cooling liquid through a heat exchanger to transfer the heat indirectly to boiling water. This is not normally preferred due to the additional heat exchanger ΔT imposed. A preferred arrangement is to flash the engine coolant after it exits the engine, by reducing the pressure. This may be done by simply allowing it to flow to a higher elevation, or alternatively as illustrated via pressure reduction valve 19 and phase separation tank 20. The flash may be done all in one step, or may include a second step at further reduced pressure using valve 21 and separator 22. Thereby the steam from separator 20 is at a somewhat higher pressure than that from separator 22, and ejector 15 supplies the pressure deficit. Thus, assuming cooling water exits the engine at 120° C. and is to be cooled down to 105° C. before recirculation, a single flash would yield low pressure steam at 118 kPa, whereas two flashes, one to 112.5° C. and the second to 105° C., plus ejector compression of the lower half, yields a low pressure steam at 151 kPa. With a low pressure supply pressure some 28% higher, the steam delivery pressure will also be approximately 28% higher, other factors being equal.

When the engine cooling system heat quantity is more than the heat removal capacity (LP steam absorption capacity) of the absorber 14, then it may be desirable on at least two counts to add supplementary heat at combustor 5. First, due to the heat pumping effect, each BTU of supplementary fuel yields close to 1.6 BTU's of additional medium pressure steam. Secondly, by increasing the desorption capacity of desorber 7 until the entire engine jacket cooling load can be absorbed at absorber 14, then the expense of a separate engine cooling heat rejection system (radiator, cooling tower, etc.) can be avoided.

Since desorber 7 must operate at a substantially higher temperature than the saturation temperature of the desorbed medium pressure steam, due to boiling point elevation, it is still possible to generate a small additional amount of medium pressure steam using the exhaust gas effluent from desorber 7 as the heat source. Similarly it is also possible to generate an additional low pressure steam from residual heat in the exhaust gas, for feeding to absorber 14. The exhaust gas residual heat may also be beneficially used to heat the various feedwater streams, e.g., line 17. Some internal combustion engines, e.g., gas turbines, have minimal or no cooling system heat. For that type of engine, essentially all of the low pressure steam would be derived from residual heat in the combustion exhaust.

FIG. 2 illustrates the open cycle absorption heat pump only, in its simplest embodiment. The tie-ins to the internal combustion engine are via hot combustion gas header 201 and low pressure steam supply header 202, although it will be apparent to the artisan that the hot combustion gas and the LP steam may equally well be from any other source. The combustion gas heats absorbent solution in desorber 203 via indirect heat exchange. Low pressure steam is absorbed into the absorbent solution in absorber 204. Useful pressure steam generated in the heating coils 205 of absorber 204 is combined with that desorber from desorber 203 and delivered to the load. The aqueous absorbent solution is circulated between absorber 204 and desorber 203 by solution pump 206, solution heat exchanger 207, and means for pressure reduction 208.

Although in its broadest form this disclosure extends to the use of any aqueous absorbent in liquid phase, such as LiBr, other alkali halides, glycols, phosphoric acid, alkali hydroxides, and alkali thiocyanates, the particular conditions disclosed result in alkali nitrates (optionally with nitrites) being the strongly preferred absorbent. There are two reasons. First, since hot combustion gas directly heats the desorber, high local temperatures are encountered, well above 200° C. Many absorbents are either unstable or highly corrosive to ordinary construction materials at that temperature. Secondly, being open cycle, traces of contaminants will unavoidably be introduced into the absorbent from the LP steam in 202, especially $CO_2$ and air. Some absorbents will chemically irreversibly react with $CO_2$, e.g., the hydroxides, whereas the nitrates are essentially inert to those constituents.

FIG. 3 illustrates a further improvement over the single-stage open-cycle solution compressor of steam. When a desorber operates at about 240° C., whereas the combustion gas is 600° C. or hotter, the desorber uses the heat content above 240° C. but not the availability above 240° C. To use the availability also, a second, higher temperature and pressure desorber is required. Such a desorber provides the same benefits as a supplementary fuel-fired burner, but without the added fuel consumption.

In FIG. 3, absorber 301 contacts low pressure steam from line 302 with absorbent solution to release heat and boil medium pressure steam in boiler 303. The absorbent solution is then sent to two different desorbers, high temperature desorber 304 and medium temperature desorber 305. It is known in the art and permissible to route the absorbent sequentially through the two absorbers, either to the higher temperature or lower temperature one first. However, the pressure of desorber 304 must be high enough that the saturation temperature of the desorbed steam is slightly higher than the temperature of desorber 305. The pressure will typically be in the range of 1500 to 6000 kPa. Therefore, a parallel feed arrangement is preferred, as illustrated, to minimize the required pumping power. Somewhat less than half the absorbent is pressurized to desorber 304 pressure by solution pump 306 and warmed in heat exchanger 307, then heated by the hottest combustion gas in desorber 304. The desorbed steam is routed to coil 308 in desorber 305, where it condenses while providing at least part of the desorption heat. Condensate is withdrawn via valve 309. The desorbed absorbent from desorber 304 is letdown in pressure by valve 310 (which may alternatively be a jet ejector, for example), and recycled to absorber 301. The remaining major fraction of absorbent solution is pressurized in pump 311, warmed in heat exchanger 312, and sprayed into (or otherwise supplied to) desorber 305. Desorption heat is provided minimally by heater 308, and preferably also by remaining combustion gas heat in heater 313. Useful pressure steam is withdrawn in line 314, and may be combined with that generated in boiler 303. Remaining residual heat in the exhaust may be used to heat waste heat boiler 315, which is also supplied with feedwater and produces useful pressure or low pressure steam. Desorbed solution from desorber 305 is let down in pressure by valve 316 and also returned to absorber 301.

The two-stage generator embodiment of FIG. 3 involves much higher desorber temepratures, on the order of 300° to 400° C. Not all nitrate-nitrite mixtures are suitable for those conditions, due to thermal stability problems. For example, it is desirable at those conditions to preclude both lithium cations and nitrite anions. A mixture comprised of sodium and potassium nitrate, optionally admixed with at least one of rubidium and cesium nitrate, is preferred above 300° C. At lower temepratures increasing lithium cation content is preferred.

The direct contact steam desuperheater and scrubber is particularly preferred on the higher temperature generators. This is due to the tendency to generate trace levels of NOx gas with the steam, which the scrubber removes. However, it will be recognized that the direct contact desuperheater is of general utility to all absorption cycles, whether open or closed, as a low cost means of providing additional sensible heat recovery.

I claim:

1. An apparatus for producing steam at a useful pressure above about 300 kPa absolute from both the combustion exhaust gas heat and the cooling system heat of an internal combustion engine, comprised of:
    a. a means for producing at least one supply of low pressure steam at a pressure below about 200 kPa from the said cooling system heat; and
    b. an absorption apparatus which is designed, dimensioned, and adapted for containing and circulating a liquid absorbent solution capable of reversibly absorbing and desorbing water vapor, said absorption apparatus comprised of:
        (i) an absorption heat exchanger wherein said low pressure steam is contacted by and absorbed into said absorbent solution, and wherein the heat released thereby is indirectly transferred via said absorption heat exchanger to boiling feedwater, whereby part of said useful pressure steam is produced;
        (ii) a solution pump for increasing the pressure of the absorbent solution from the absorption heat exchanger to at least approximately said useful pressure;
        (iii) a desorption heat exchanger wherein said absorbent solution from said solution pump undergoes indirect heat exchange with said combustion exhaust gas, whereby a second part of said steam at useful pressure is desorbed from said absorbent solution; and
        (iv) a means for reducing the pressure of said absorbent solution from said desorption heat exchanger and recycling said solution to said absorption heat exchanger.

2. Apparatus according to claim 1 wherein said absorbent solution is comprised of sodium nitrate and potassium nitrate in aqueous solution.

3. Apparatus according to claim 2 wherein said absorbent solution is additionally comprised of lithium nitrate.

4. Apparatus according to claim 2 wherein said absorbent solution is additionally comprised of at least one of sodium nitrite, cesium nitrate, potassium nitrite and rubidium nitrate.

5. Apparatus according to claim 1 additionally comprised of a solution heat exchanger for indirect exchange of sensible heat between said absorbent solution en route to and from said desorption heat exchanger.

6. Apparatus according to claim 1 wherein said means for reducing the pressure of said absorbent solution is a jet ejector which takes suction on and increases the pressure of at least part of said low pressure steam.

7. Apparatus according to claim 1 additionally comprised of a waste heat boiler which raises additional low pressure steam for said absorption heat exchanger from residual heat in exhaust gas effluent said desorption heat exchanger.

8. Apparatus according to claim 1 additionally comprised of a means for indirect heat exchange between said combustion exhaust gas after exiting said desorption heat exchanger and a supply of feedwater at about said useful pressure.

9. Apparatus according to claim 1 additionally comprised of a steam scrubbing apparatus comprised of a zone of countercurrent vapor-liquid contact and a means for supplying feedwater at about said useful pressure to the top of said zone and desorbed steam from said desorption heat exchanger to the bottom of said zone for scrubbing therein.

10. Apparatus according to claim 1 additionally comprised of an apparatus for scrubbing impurities from said desorbed steam comprised of:
    (a) a zone of vapor-liquid contact; and
    (b) a means for supplying at least part of said absorbent solution en route to said desorption heat exchanger to said zone.

11. Apparatus according to claim 10 additionally comprised of a solution heat exchanger; and wherein said liquid absorbent mixture is an aqueous mixture of nitrates of lithium, sodium, and potassium; and wherein said means for pressure reduction is a jet ejector.

12. A thermally actuated solution compressor for steam which produces medium pressure steam from inputs of high temperature heat and low pressure steam, comprised of:
    (a) an aqueous solution comprised of sodium nitrate and potassium nitrate;
    (b) an absorption heat exchanger for absorbing said low pressure steam into said aqueous solution, and indirectly transferring the absorption heat to feedwater boiling at said medium pressure;
    (c) a desorption heat exchanger for indirectly transferring said high temperature heat to said aqueous solution at a pressure no lower than said medium pressure;
    (d) a solution pump, a solution heat exchanger, and a means for solution pressure reduction, said components arranged to effect circulation of the aqueous solution between said absorption and desorption heat exchangers; and
    (e) a scrubbing and desuperheating apparatus for the medium pressure steam which is desorbed in said desorption heat exchanger, comprised of:
        (i) a gas-liquid countercurrent contact zone;
        (ii) a means for supplying a minor fraction of the aqueous solution en route to said desorption heat exchanger to the top of said contact zone; and
        (iii) a means for supplying said desorbed steam to the bottom of said contact zone.

13. Apparatus according to claim 12 additionally comprised of an internal combustion engine including means for supplying the exhaust gas from said internal combustion engine to said desorption heat exchanger as said source of heat therefor; and means for obtaining said low pressure steam from the engine cooling circuit.

14. Apparatus according to claim 12 wherein said means for pressure reduction is a jet ejector which takes suction on and raises the pressure of at least part of said low pressure steam.

15. Apparatus according to claim 12 wherein said aqueous solution is additionally comprised of at most one of lithium cations and nitrite anions.

16. Apparatus according to claim 12 additionally comprised of a second desorption heat exchanger which is heated at least in part by steam desorbed from said previously recited desorption heat exchanger heated by high temperature heat, said desorbed steam at a pressure at least about two times said medium pressure, whereby part of said steam at medium pressure is desorbed from the aqueous solution in said second desorption heat exchanger.

17. Open cycle apparatus for increasing the pressure and quantity of a supply of low pressure steam by applying an amount of high temperature heat which is lower in quantity than the heat content of said low pressure steam, said apparatus comprised of:
    (a) an aqueous absorbent solution comprised of sodium and potassium nitrate;
    (b) an absorption heat exchanger in which said low pressure steam is absorbed into said aqueous absorbent solution, and which produces a major fraction of said increased pressure steam;
    (c) a first desorption heat exchanger which is indirectly heated by said high temperature heat and desorbs high pressure steam;
    (d) a second desorption heat exchanger which is indirectly heated by said desorbed high pressure steam, and which produces a minor fraction of said low pressure steam at increased pressure;
    (e) a solution pump for circulating said aqueous solution from said absorption heat exchanger to both of said desorption heat exchangers;
    (f) an internal combustion engine including means for supplying the exhaust gas from said internal combustion engine to said first desorption heat exchanger as said source of heat therefor; and
    (g) a means for obtaining said low pressure steam from the cooling system of said engine.

18. Apparatus according to claim 17 wherein said absorbent solution is additionally comprised of at most one of a lithium cation component and a nitrite anion component.

* * * * *